(12) United States Patent
Ganiere

(10) Patent No.: US 7,128,186 B2
(45) Date of Patent: Oct. 31, 2006

(54) AIRPORT BRIDGE PEOPLE LIFT

(75) Inventor: Jeff Ganiere, 330 N. Spring Blvd., Tarpon Springs, FL (US) 34689

(73) Assignee: Jeff Ganiere, Tarpon Springs, FL (US)

( * ) Notice: Subject to any disclaimer, the term of this patent is extended or adjusted under 35 U.S.C. 154(b) by 375 days.

(21) Appl. No.: 10/848,197

(22) Filed: May 18, 2004

(65) Prior Publication Data

US 2006/0049312 A1    Mar. 9, 2006

(51) Int. Cl.
*E04G 1/22*    (2006.01)
*E04G 3/00*    (2006.01)
*E01D 1/00*    (2006.01)

(52) U.S. Cl. ............... 182/63.1; 182/141; 182/2.11; 14/69.5; 14/71.3; 244/118.5; 244/137.2

(58) Field of Classification Search ............... 182/141, 182/63.1, 62.5, 2.1, 2.11, 2.2, 2.3, 2.6, 2.7, 182/2.8, 2.9, 127, 115, 113; 14/69.5, 71.3, 14/72.5, 71.1, 71.5, 71.7; 244/118.5, 137.2; 52/182–188
See application file for complete search history.

(56) References Cited

U.S. PATENT DOCUMENTS

| | | | | | |
|---|---|---|---|---|---|
| 1,718,979 | A | * | 7/1929 | Protzeller | 182/62.5 |
| 3,415,339 | A | * | 12/1968 | Range | 182/2.7 |
| 3,509,965 | A | * | 5/1970 | Mitchell | 182/62.5 |
| 3,664,456 | A | * | 5/1972 | Smith et al. | 182/62.5 |
| 3,709,322 | A | * | 1/1973 | Mitchell | 182/62.5 |
| 3,910,264 | A | * | 10/1975 | Mahieu | 182/69.4 |
| 4,335,803 | A | * | 6/1982 | Sugita | 182/68.1 |
| 4,473,916 | A | * | 10/1984 | Connold | 14/71.5 |
| 4,633,975 | A | * | 1/1987 | Connor et al. | 182/2.6 |
| 5,027,922 | A | * | 7/1991 | Benko et al. | 182/141 |
| 5,152,370 | A | * | 10/1992 | Silberman | 182/141 |
| 5,154,569 | A | * | 10/1992 | Eryou et al. | 182/141 |
| 5,299,653 | A | * | 4/1994 | Nebel | 182/2.7 |
| 5,363,940 | A | * | 11/1994 | Fahrion | 182/62.5 |
| 5,524,318 | A | * | 6/1996 | Thomas | 14/72.5 |
| 5,555,953 | A | * | 9/1996 | Henderson | 182/141 |
| 6,234,272 | B1 | * | 5/2001 | Plentl, Jr. | 182/115 |
| 6,330,726 | B1 | * | 12/2001 | Hone et al. | 14/71.5 |
| 6,405,831 | B1 | * | 6/2002 | Daniel, III | 182/141 |
| 6,467,576 | B1 | * | 10/2002 | Figura et al. | 182/63.1 |
| 6,523,647 | B1 | * | 2/2003 | Duplessis | 182/141 |
| 6,659,225 | B1 | * | 12/2003 | Olliges et al. | 244/118.5 |

* cited by examiner

*Primary Examiner*—Hugh B. Thompson, II
(74) *Attorney, Agent, or Firm*—Dennis G. LaPointe

(57) ABSTRACT

The present invention is an aircraft people lift system for use in combination with a movable elevated passenger walkway/bridge having an attached auxiliary access stairway and landing platform. The system includes a lifting portion which has a longitudinal base portion and a longitudinal elevating portion from which a personnel carrier platform is pivotally attached to a distal end of the longitudinal elevating portion. The longitudinal base portion is attached at its approximate distal end to a bogie wheel carriage frame structure of a passenger walkway/bridge. The lifting portion is capable of raising and lowering the personnel carrier platform such that the personnel carrier platform maintains a generally perpendicular relationship with the ground surface beneath the landing platform as it is being raised and lowered to and from the ground surface from and to an upper portion landing platform of the auxiliary access stairway.

14 Claims, 5 Drawing Sheets

AIRPORT BRIDGE PEOPLE LIFT

FIELD OF THE INVENTION

The invention generally relates to a lifting system for moving people between the bridge stairway landing platform and the ground surface.

BACKGROUND OF THE INVENTION

Passenger walkway/bridges typically lack the ability to load and unload handicapped passengers from the ground surface area. Certainly, airports that invest in mobile elevator and baggage ramps such as that disclosed by the present inventor in U.S. Pat. No. 6,676,359 may be able to drive the ramp system over to a walkway/bridge and connect it so as to board or deboard a handicapped person. However, this is time consuming and could delay aircraft departure time.

In some cases, to bring a portable lift to a bridge area is often not practical as the stairway landing platform may have steel permanent hand rails.

What is needed is a less costly system that is attached to the walkway/bridge with a "cherry picker" type of lifting platform or box, which will allow for immediate boarding or deboarding of the handicapped person. However, where "cherry picker" types of lifts would not allow for maintaining a side-by-side perpendicular relationship with the stairway landing platform without moving the complete lift assembly, what is needed is an apparatus where the personnel box can simultaneously adjust horizontally and vertically without being moved relative to or physically detached from the walkway/bridge. That is, a system where the apparatus has means for raising and lowering the personnel carrier platform such that the personnel carrier platform maintains a generally perpendicular relationship with the ground surface beneath the landing platform as it is being raised and lowered to and from the ground surface from and to an upper portion landing platform of the auxiliary access stairway.

Also, with some lifts currently available with attached stairways such as that disclosed in U.S. Pat. No. 6,676,359, the end of the attached stairway is vulnerable to being hit by moving trained baggage carts, which can cause problems when the lift portion is elevated to the landing level. What is needed is a system that telescopes or collapses out of the way of trained baggage carts when the system is in an elevated mode.

SUMMARY OF THE INVENTION

The present invention is an aircraft people lift system for use in combination with a movable elevated passenger walkway/bridge having attached to the movable elevated passenger walkway/bridge an auxiliary access stairway extending downwardly on an incline from the movable elevated passenger walkway/bridge to the ground surface. The auxiliary access stairway typically has a landing platform at its upper end for facilitating access for airline service employees to and from the elevated passenger walkway/bridge from and to the ground surface.

The system comprises a lifting portion which is made from a generally collapsible V-shaped frame. The V-shaped frame has a longitudinal base portion and a longitudinal elevating portion from which a personnel carrier platform is pivotally attached to a distal end of the longitudinal elevating portion. The lifting portion is in a generally side-by-side relationship with the auxiliary access stairway.

The longitudinal base portion is attached at its approximate distal end to a bogie wheel carriage frame structure of a passenger walkway/bridge, which facilitates the movement of the lifting portion along a ground surface in unison with the passenger walkway/bridge as the passenger walkway/bridge is positioned to service an aircraft.

The lifting portion has means for raising and lowering the personnel carrier platform such that the personnel carrier platform maintains a generally perpendicular relationship with the ground surface beneath the landing platform as it is being raised and lowered to and from the ground surface from and to an upper portion landing platform of the auxiliary access stairway.

The system further includes means for elevating the longitudinal elevating portion of the V-shaped frame, including the pivotally attached personnel carrier platform. Ground bearing mobility means, such as casters or wheels, are provided for moving the lifting portion in unison with the passenger walkway/bridge and for facilitating the generally perpendicular relationship of the personnel carrier platform with the ground surface beneath the landing platform as it is being raised and lowered to and from the ground surface from and to the upper portion landing platform of the auxiliary access stairway.

The invention further includes means for access to/from the personnel carrier platform from/to the ground surface, such as a plate member that can be lowered to the ground to form a ramp and when elevated, serves as a restraint guard; and means for access to/from the personnel carrier platform from/to the upper portion landing platform, such as chains, ropes, on an open side of the personnel carrier platform and a openable gate on the landing platform itself adjacent the personnel carrier platform. Alternatively, an openable gate such as a sliding gate could be included on the open side of the personnel carrier platform.

The means for raising and lowering the personnel carrier platform perpendicularly between the landing platform and the ground surface includes means for telescoping said longitudinal base portion. The means for elevating the longitudinal elevating portion of the V-shaped frame is actuator means, which can be hydraulically or pneumatically powered. Hydraulic actuators are the most common and preferable. Electric powered means such as chain driven systems are also contemplated as alternative ways to raise and lower the personnel carrier platform.

The means for telescoping the longitudinal base portion comprises a first longitudinal frame portion adapted so as to be in telescoping communication with a second longitudinal frame portion distal from the apex of the V-shaped frame; and a third longitudinal frame portion pivotally attached on one end proximate the apex of the V-shaped frame and pivotally attached at its opposite end to an end of a fourth longitudinal frame portion, which in turn is pivotally attached at its opposite end to the second longitudinal frame portion. An additional longitudinal frame portion can be pivotally attached at one end to the joined pivotal attachment of the third and fourth longitudinal frame portions and its opposite end can be pivotally attached to the longitudinal elevating portion, should additional structural support be desired.

The present invention further includes means for controlling the elevating and descending of the personnel carrier platform. These controls may be located any convenient location to the frame work of the lifting portion preferably near its apex. It is also desirable to include means for emergent stopping of the elevating or descending of the personnel carrier platform. This emergent feature is preferably located at the personnel carrier platform in such a way that an occupant in the personnel carrier platform can reach for the emergency stop, which may be a simple stop button.

The means for access to/from the personnel carrier platform from/to the ground surface further is typically provided as a generally planar member or plate pivotally attached to a side of the personnel carrier platform furthest away from the upper portion landing platform when the personnel carrier platform is in the elevated position. It is capable of pivoting from a generally vertical orientation to a generally horizontal orientation for resting on the ground surface. When in the vertical orientation, it serves as a guard to prevent a person or an article being elevated from falling off the personnel carrier platform.

In the vertical position, the plate member can be locked in position. It is also preferable that an automatic lock release mechanism be incorporated such that as the platform comes in touch with the ground surface, the locking device is released so that the plate member can be lowered to the ground. Of course, this can be done manually as well. For example, the locking device can be linked to a depending pin that is pushed up as the bottom of the platform starts touching the ground. In turn the pushed pin engages a lock release mechanism on the lock to allow for the dropping of the plate. Conversely, it is also desirable that this type of release mechanism also be spring loaded so that as the platform starts ascending, then the pin comes back down and in doing so re-engages the locking mechanism.

As with many lifts that may be hydraulically powered, there is sometimes creep that allows the elevated platform to descend a little. Therefore, in another embodiment, it is preferable to incorporate within the means for controlling the elevating and descending of the personnel carrier platform locking means for preventing the hydraulic creeping of the personnel carrier platform downward when the personnel carrier platform is in the elevated position.

The means for access to/from the personnel carrier platform from/to the upper portion landing platform includes temporary restraint means across a generally open side of the personnel carrier platform adjacent the upper portion landing platform; and gate means juxtaposed the open side of the personnel carrier platform on the upper portion landing platform. The temporary restraint means can be a detachable lanyard comprising one or more chains, ropes or cables. It is also preferable in another embodiment that the gate means includes means for preventing the elevating or descending of the personnel carrier platform if the gate means is not in a closed position. This can be provided in the form of a solenoid type of circuit where when the gate is closed, the circuit is closed to enable the operation of the lifting apparatus. The temporary restraint means may alternatively be a gate on the personnel carrier platform that can be opened to allow access to the upper portion landing platform, instead of chains, rope or cables.

BRIEF DESCRIPTION OF THE DRAWINGS

In the accompanying drawings.

DETAILED DESCRIPTION OF THE INVENTION

Figure 1:
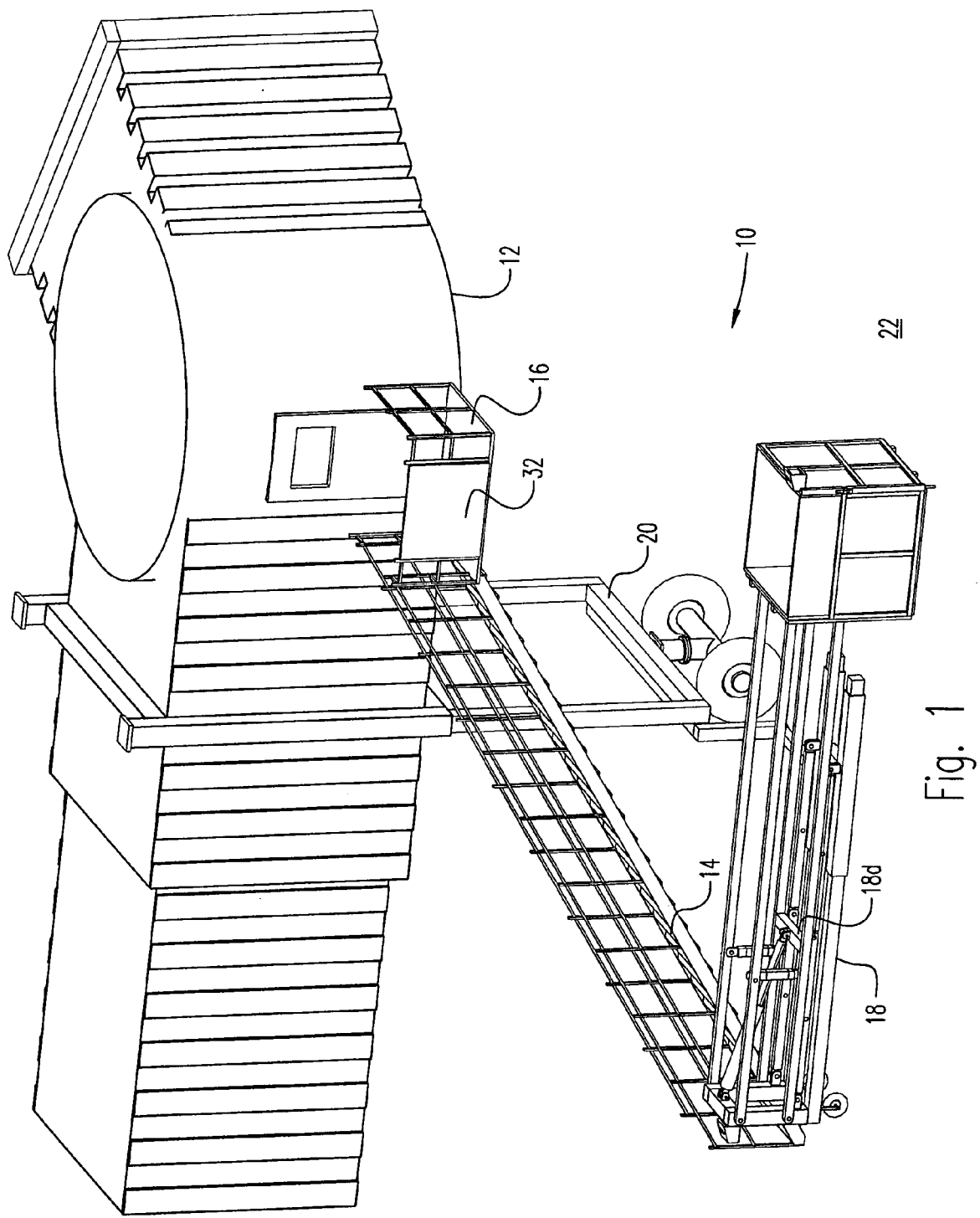
FIG. 1 is conceptual depiction of a typical application of the invention where the personnel platform portion of the invention is lowered to the ground loading/unloading position.
Figure 2:
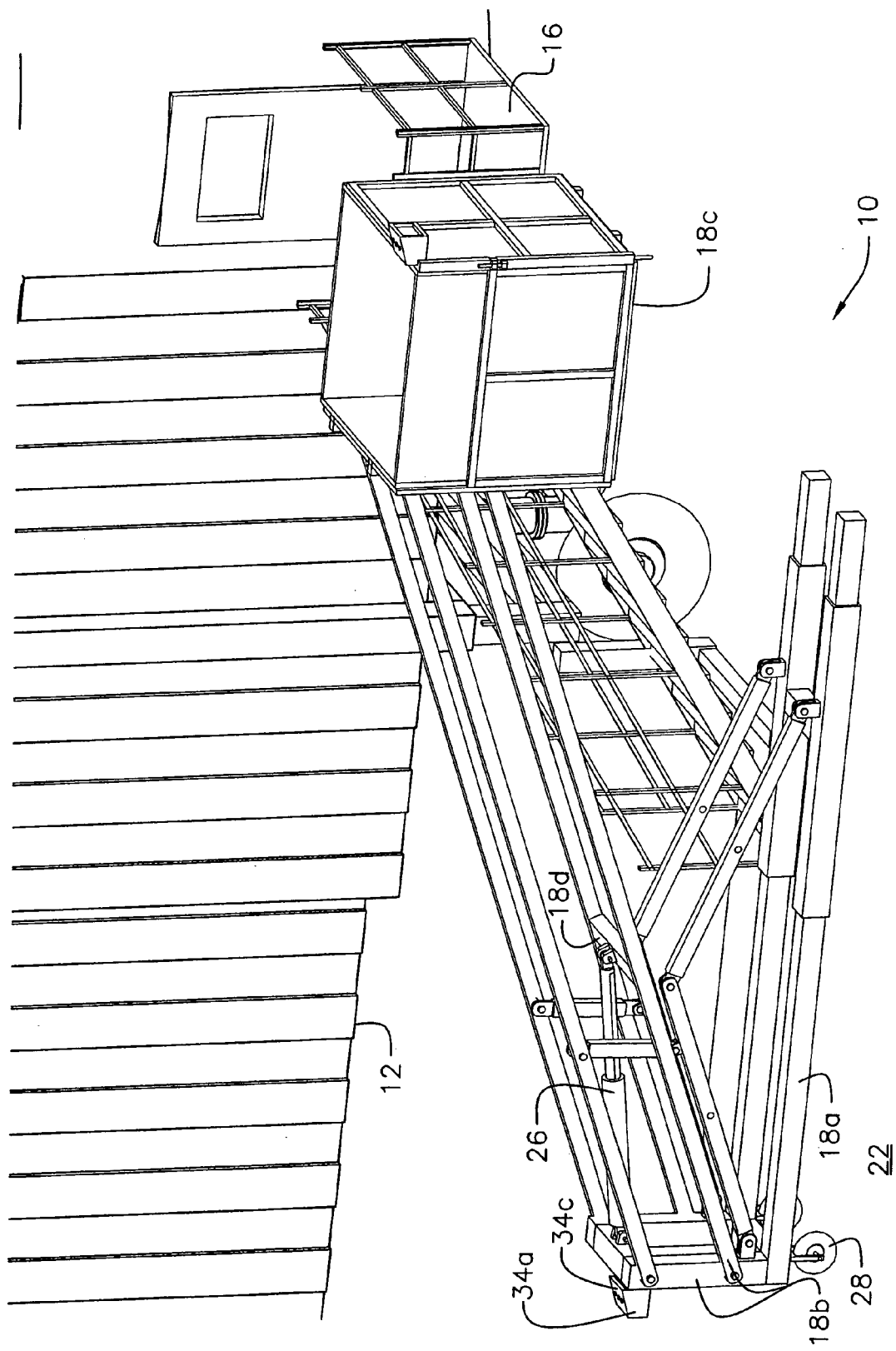
FIG. 2 is a conceptual view of the invention with the lifting portion in an elevated position and aligned juxtaposed the bridge stairway landing platform, which presumably may be servicing an aircraft such as the McDonnell Douglas MD-80.
Figure 3:
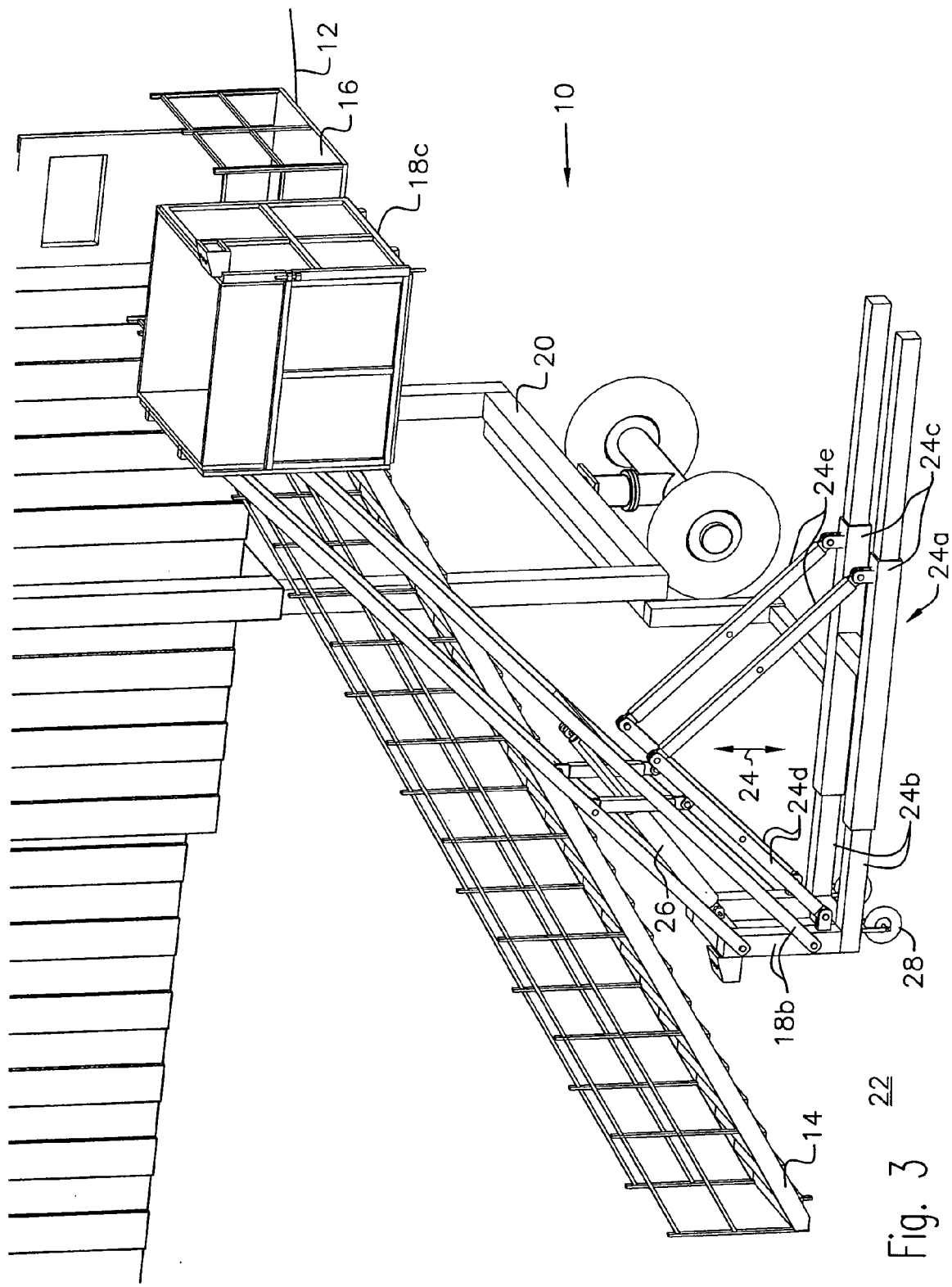
FIG. 3 is a conceptual view of the lifting portion shown at another typical elevated position for use with bridges running to an aircraft such as the Boeing 747.
Figure 4:
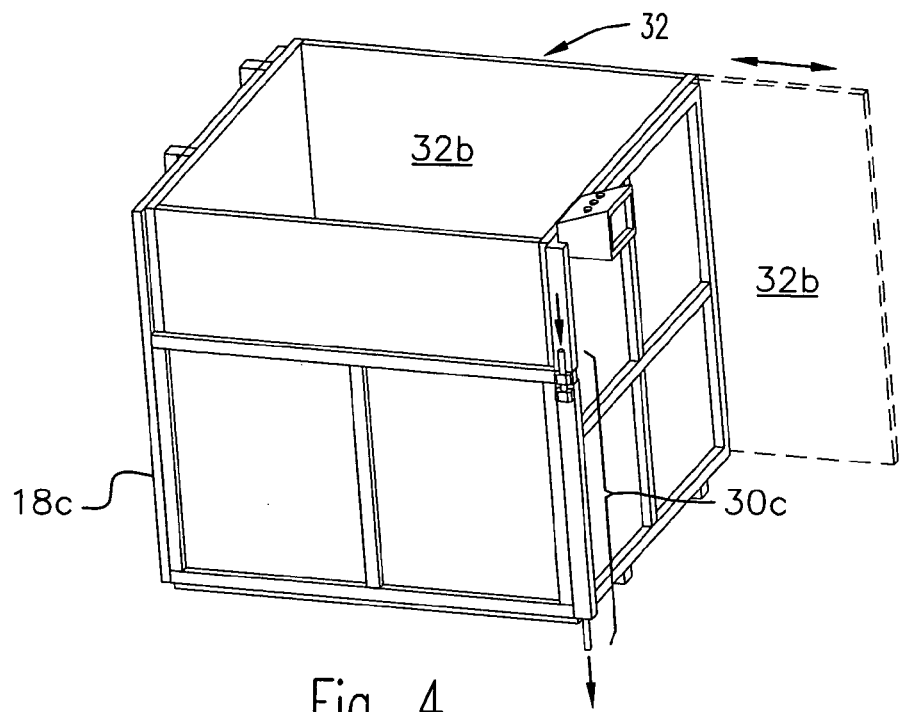
FIG. 4 is a perspective view of an example of a personnel carrier platform with a sliding gate portion for access to the landing platform of the stairway.
Figure 5:
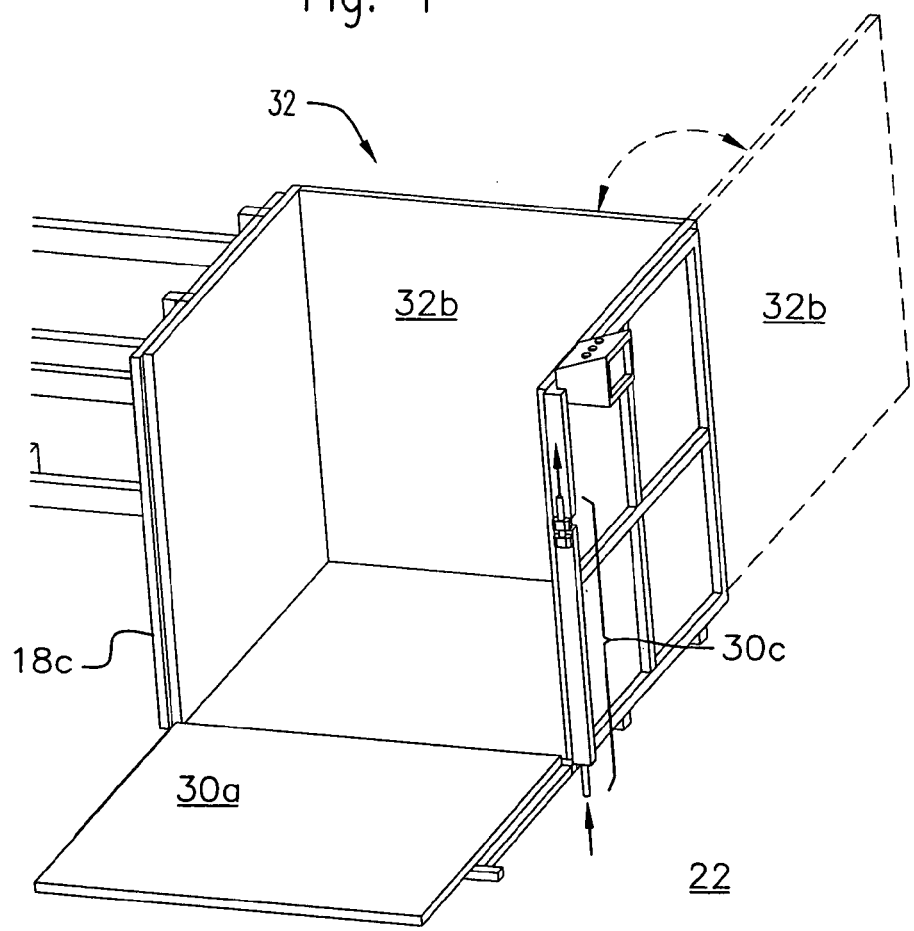
FIG. 5 is a perspective view of another example of a personnel carrier platform with a gate which swings open and close for access to the landing platform of the stairway and the opposite gate lowered to the ground surface for loading/unloading of personnel.
Figure 6:
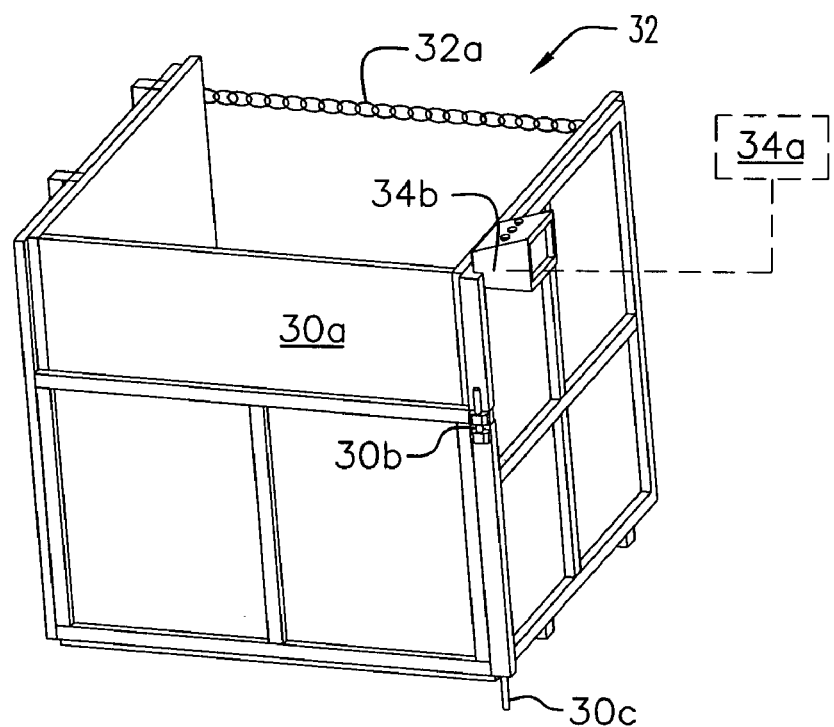
FIG. 6 is a perspective view of another example of a personnel carrier platform with a lanyard or chain across an open side of the personnel carrier platform for access to the landing platform of the stairway.

Referring now to the drawings, FIGS. 1–7 disclose the present invention, which is an aircraft people lift system, depicted generally as 10. This system 10 is used in combination with a movable elevated passenger walkway/bridge 12, which has attached to it an auxiliary access stairway 14 extending downwardly on an incline from the movable elevated passenger walkway/bridge 12 to the ground surface 22. The auxiliary access stairway 14 typically has a landing platform 16 at its upper end for facilitating access for airline service employees to and from the elevated passenger walkway/bridge 12 from and to the ground surface 22.

The system 10 comprises a lifting portion 18, which is made from a generally collapsible V-shaped frame. It is V-shaped in the sense that it is comprised by a structural frame work and it essentially pivots from one end or edge, referred to hereinafter as the apex end. The V-shaped frame has a longitudinal base portion 18a and a longitudinal elevating portion 18b from which a personnel carrier platform 18c is pivotally attached to a distal end of the longitudinal elevating portion 18b. The lifting portion 18 is in a generally side-by-side relationship with the auxiliary access stairway 14.

The longitudinal base portion 18a is attached at its approximate distal end to a bogie wheel carriage frame structure 20 of a passenger walkway/bridge 12, which facilitates the movement of the lifting portion 18 along a ground surface 22 in unison with the passenger walkway/bridge 12 as the passenger walkway/bridge 12 is positioned to service an aircraft. As seen from the drawings, which are conceptual representations, this attachment can be in the form of a cantilevered frame structure, which is fitted to suit to the bogie wheel carriage frame structure 20 underlying the passenger walkway/bridge 12. For example, the attachment could be to the side of the bogie wheel carriage frame structure 20 or to a cross member of the carriage frame structure 20 depending on any interference that might be present.

The lifting portion 18 has means 24 for raising and lowering the personnel carrier platform 18c such that the personnel carrier platform 18c maintains a generally perpendicular relationship with the ground surface 22 beneath the landing platform 16 as it is being raised and lowered to and from the ground surface 22 from and to an upper portion landing platform 16 of the auxiliary access stairway 14.

The system 10 further includes means 26 for elevating the longitudinal elevating portion 18b of the V-shaped frame, including the pivotally attached personnel carrier platform 18c. Ground bearing mobility means 28, such as casters or wheels, are provided for moving the lifting portion 18 in unison with the passenger walkway/bridge 12 and for facilitating the generally perpendicular relationship of the personnel carrier platform 18c with the ground surface 22 beneath the landing platform 16 as it is being raised and lowered to and from the ground surface 22 from and to the upper portion landing platform 16 of the auxiliary access stairway 14.

The invention 10 further includes means 30 for access to/from the personnel carrier platform 18c from/to the ground surface 22, such as a plate member 30a that can be lowered to the ground 22 to form a ramp and when elevated, serves as a restraint guard; and means 32 for access to/from the personnel carrier platform 18c from/to the upper portion landing platform 16, such as chains, ropes, or cables 32a on an open side of the personnel carrier platform 18c; and a openable gate 32b on the landing platform 16 itself adjacent the personnel carrier platform 18c. Alternatively, an openable gate 32b such as a sliding gate could be included on the open side of the personnel carrier platform 18c. See alternative types of gates 32b for the landing platform 16 rail side shown in FIG. 7.

The means 24 for raising and lowering the personnel carrier platform 18c perpendicularly between the landing platform 16 and the ground surface 22 includes means 24a for telescoping the longitudinal base portion 18a. The means 26 for elevating the longitudinal elevating portion 18b of the V-shaped frame may be an actuator, which can be hydraulically or pneumatically powered. Hydraulic actuators are the most common and preferable. Electric powered means such as chain driven systems are also contemplated as alternative ways to raise and lower the personnel carrier platform 18c.

The means 24a for telescoping the longitudinal base portion comprises a first longitudinal or elongate frame portion 24b adapted so as to be in telescoping communication with a second longitudinal or elongate frame portion 24c distal from the apex of the V-shaped frame, and a third longitudinal or elongate frame portion 24d pivotally attached on one end proximate the apex of the V-shaped frame and pivotally attached at its opposite end to an end of a fourth longitudinal or elongate frame portion 24e, which in turn is pivotally attached at its opposite end to the second longitudinal frame portion 24c.

As shown in the drawings, these longitudinal or elongate frame portions 24b–24e are actually parallel frame structure spaced-apart. The longitudinal elevating portion 18b is typically also made from a spaced-apart frame structure such as the dual rail structure shown the drawings. The elevating means or actuator 24 is fixed to the V-shaped frame structure on one end and attached to a cross-member or transversely oriented member 18d across the framed longitudinal elevating portion (rails) 18b.

The present invention 10 further includes means 34a for controlling the elevating and descending of the personnel carrier platform 18c. These controls may be located any convenient location to the frame work of the lifting portion 18 preferably near its apex. It is also desirable to include means 34b for emergent stopping of the elevating or descending of the personnel carrier platform 18c. This emergent feature is preferably located at the personnel carrier platform 18c in such a way that an occupant in the personnel carrier platform 18c can reach for the emergency stop 34b, which may be a simple stop button.

The means 30 for access to/from the personnel carrier platform 18c from/to the ground surface 22 further is typically provided as a generally planar member or plate 30a pivotally attached to a side of the personnel carrier platform 18c furthest away from the upper portion landing platform 16 when the personnel carrier platform 18c is in the elevated position. It is capable of pivoting from a generally vertical orientation to a generally horizontal orientation for resting on the ground surface 22. When in the vertical orientation, it serves as a guard to prevent a person or an article being elevated from falling off the personnel carrier platform 18c.

In the vertical position, the plate member 30a can be locked in position. It is also preferable that an automatic lock release mechanism 30b be incorporated such that as the platform 18c comes in touch with the ground surface 22, the locking device 30c is released so that the plate member 30a can be lowered to the ground 22. Of course, this can be done manually as well. For example, the locking device 30b can be linked to a depending pin that is pushed up as the bottom of the platform 18c starts touching the ground. In turn the pushed pin engages a release mechanism on the lock 30b to allow for the dropping of the plate 30a. Conversely, it is also desirable that this type of release locking mechanism 30b also be spring loaded so that as the platform 18c starts ascending, then the pin comes back down and in doing so re-engages the locking mechanism 30b.

As with many lifts that may be hydraulically powered, there is sometimes creep that allows the elevated platform to descend a little. Therefore, in another embodiment, it is preferable to incorporate within the means 34a for controlling the elevating and descending of the personnel carrier platform 18c locking means 34c for preventing the hydraulic creeping of the personnel carrier platform 18c downward when the personnel carrier platform 18c is in the elevated position.

Figure 7:
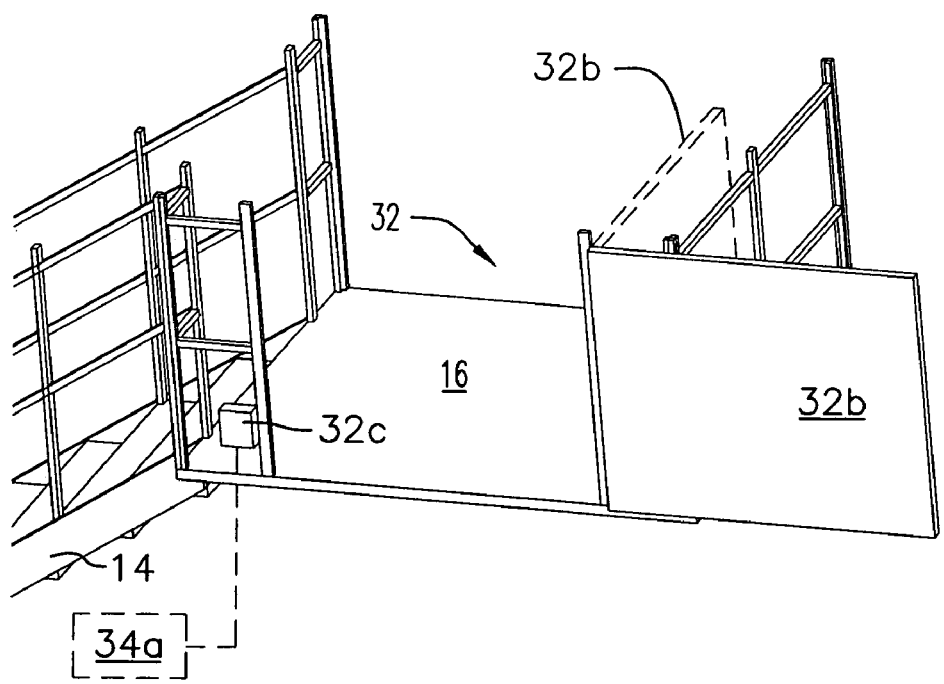
FIG. 7 is a partial view of the landing platform depicting examples of gates on the landing platform side, for example, one gate may be a sliding gate or a swing-type of gate may be provided instead.

As discussed above, the means 32 for access to/from the personnel carrier platform 18c from/to the upper portion landing platform 16 includes temporary restraint means 32a across a generally open side of the personnel carrier platform 18c adjacent the upper portion landing platform 16, and gate means 32b juxtaposed the open side of the personnel carrier platform 18c on the upper portion landing platform 16 (FIG. 7 depicts a sliding gate and an alternative hinged gate shown in phantom lines). The temporary restraint means 32a can be a detachable lanyard comprising one or more chains, ropes or cables. It is also preferable in another embodiment that the gate means 32b includes means 32c for preventing the elevating or descending of the personnel carrier platform 18c if the gate means 32b is not in a closed position. This can be provided in the form of a solenoid type of circuit where when the gate 32b is closed, the circuit is closed to enable the operation of the lifting apparatus 10. The temporary restraint means may alternatively be a gate (similar to 32b) on the personnel carrier platform 18c itself that can be opened to allow access to the upper portion landing platform 16, instead of chains, rope or cables.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. An aircraft people lift system for use in combination with a movable elevated passenger walkway/bridge having attached to said movable elevated passenger walkway/bridge an auxiliary access stairway extending downwardly on an incline from the movable elevated passenger walkway/bridge to the ground surface, the auxiliary access stairway having a landing platform at its upper end for facilitating access for airline service employees to and from the elevated passenger walkway/bridge from and to the ground surface, the system comprising:

a lifting portion comprising a generally collapsible V-shaped frame, the V-shaped frame having a longitudinal base portion and a longitudinal elevating portion from which a personnel carrier platform is pivotally attached to a distal end of said longitudinal elevating portion, the lifting portion being in a generally side-by-side relationship with the auxiliary access stairway;

the longitudinal base portion being attached at its approximate distal end to a bogie wheel carriage frame structure of the passenger walkway/bridge to facilitate the movement of the lifting portion along a ground surface in unison with the passenger walkway/bridge as the passenger walkway/bridge is positioned to service an aircraft;

the lifting portion having means for raising and lowering the personnel carrier platform such that the personnel carrier platform maintains a generally perpendicular relationship with the ground surface beneath the landing platform as it is being raised and lowered to and from the ground surface from and to an upper portion landing platform of the auxiliary access stairway;

means for elevating the longitudinal elevating portion of the V-shaped frame, including the pivotally attached personnel carrier platform;

ground bearing mobility means for moving the lifting portion in unison with the passenger walkway/bridge and for facilitating the generally perpendicular relationship of the personnel carrier platform with the ground surface beneath the landing platform as it is being raised and lowered to and from the ground surface from and to the upper portion landing platform of the auxiliary access stairway;

means for access to/from the personnel carrier platform from/to the ground surface; and means for access to/from the personnel carrier platform from/to the upper portion landing platform.

2. The system according to claim 1, wherein the means for raising and lowering the personnel carrier platform perpendicularly between the landing platform and the ground surface includes means for telescoping said longitudinal base portion.

3. The system according to claim 2, wherein the means for telescoping said longitudinal base portion comprises:

a first longitudinal frame portion adapted so as to be in telescoping communication with a second longitudinal frame portion distal from an apex of the V-shaped frame; and a third longitudinal frame portion pivotally attached on one end proximate the apex of the V-shaped frame and pivotally attached at its opposite end to an end of a fourth longitudinal frame portion, which in turn is pivotally attached at its opposite end to the second longitudinal frame portion.

4. The system according to claim 1, wherein the means for elevating the longitudinal elevating portion of the V-shaped frame includes actuator means.

5. The system according to claim 1, further comprising means for controlling the elevating and descending of the personnel carrier platform.

6. The system according to claim 5, further comprising means for emergent stopping of the elevating or descending of the personnel carrier platform, said means for emergent stopping being located at the personnel carrier platform.

7. The system according to claim 5, wherein the means for controlling the elevating and descending of the personnel carrier platform further comprises:

locking means for preventing the hydraulic creeping of the personnel carrier platform downward when said personnel carrier platform is in the elevated position.

8. The system according to claim 1, wherein the means for access to/from the personnel carrier platform from/to the ground surface further comprises:

a generally planar member pivotally attached to a side of the personnel carrier platform furthest away from the upper portion landing platform when said personnel carrier platform is in the elevated position;

the generally planar member being capable of pivoting from a generally vertical orientation to a generally horizontal orientation for resting on the ground surface;

wherein the generally planar member when in the vertical orientation further serves as a guard to prevent a person or an article being elevated from falling off the personnel carrier platform.

9. The system according to claim 8, wherein the means for access to/from the personnel carrier platform from/to the ground surface further comprises:

locking means for maintaining the generally planar member in the vertical orientation.

10. The system according to claim 9, wherein the means for access to/from the personnel carrier platform from/to the ground surface further comprises:

means for automatically releasing the locking means when the personnel carrier platform is lowered to the ground surface and for automatically locking the generally planar member in the vertical orientation when the personnel carrier platform starts its elevation from the ground surface.

11. The system according to claim 1, wherein means for access to/from the personnel carrier platform from/to the upper portion landing platform further comprises:

a temporary restraint across a generally open side of the personnel carrier platform adjacent the upper portion landing platform; and a gate juxtaposed the open side of the personnel carrier platform on the upper portion landing platform.

12. The system according to claim 11, wherein the temporary restraint is a detachable lanyard comprising one of at least one chain, one rope and one cable.

13. The system according to claim 11, wherein the gate includes means for preventing the elevating or descending of the personnel carrier platform if the gate is not in a closed position.

14. The system according to claim 11, wherein the temporary restraint is a gate that can be opened to allow access to the upper portion landing platform.

* * * * *